United States Patent
Locher

(10) Patent No.: US 10,537,205 B2
(45) Date of Patent: Jan. 21, 2020

(54) APPLIANCE AND METHOD FOR HEATING AND/OR FROTHING MILK

(71) Applicant: EVERSYS HOLDING SA, Ardon (CH)

(72) Inventor: Grégoire Locher, Daillon (CH)

(73) Assignee: EVERSYS Holding SA, Ardon (CH)

( * ) Notice: Subject to any disclaimer, the term of this patent is extended or adjusted under 35 U.S.C. 154(b) by 316 days.

(21) Appl. No.: 15/439,331

(22) Filed: Feb. 22, 2017

(65) Prior Publication Data
US 2017/0238755 A1   Aug. 24, 2017

(30) Foreign Application Priority Data

Feb. 23, 2016   (EP) .................................... 16156809

(51) Int. Cl.
*A47J 31/44* (2006.01)
(52) U.S. Cl.
CPC ................................ *A47J 31/4489* (2013.01)
(58) Field of Classification Search
CPC .......................... A47J 31/4485; A47J 31/4489
See application file for complete search history.

(56) References Cited

U.S. PATENT DOCUMENTS

| | | | |
|---|---|---|---|
| 2,029,017 A * | 1/1936 | Cooney | A23C 3/037 165/300 |
| 4,922,810 A * | 5/1990 | Siccardi | A47J 31/4485 261/DIG. 16 |
| 4,949,631 A | 8/1990 | Fregnan | |
| 5,464,574 A * | 11/1995 | Mahlich | A47J 31/4489 261/124 |
| 6,158,328 A * | 12/2000 | Cai | A47J 31/4485 261/DIG. 76 |
| 7,600,467 B2 * | 10/2009 | Coccia | A47J 31/4485 99/293 |

(Continued)

FOREIGN PATENT DOCUMENTS

| | | |
|---|---|---|
| CN | 201223297 | 4/2009 |
| EP | 0234236 A1 | 9/1987 |

(Continued)

OTHER PUBLICATIONS

English Translation for CN201223297 published Apr. 2009.*

(Continued)

*Primary Examiner* — Anthony J Weier
(74) *Attorney, Agent, or Firm* — Paul D. Bianco; Fleit Intellectual Property Law

(57) ABSTRACT

An appliance for heating and/or frothing milk, in which steam or a mixture of steam and air acting as a heat carrier is injected into the milk, with the heating unit including an inner steam channel and an outer annular channel for the milk. The outer annular channel coaxially surrounds the inner steam channel, with hot steam or a mixture of steam and air being supplied at an upstream end of the steam channel and with milk being supplied at an upstream end of the annular channel. To improve the heat output and the energy efficiency of the heating unit and to reduce the maintenance requirement, the steam channel and the annular channel are separated from one another, with their downstream ends opening out into an outlet channel for discharging the heated and/or frothed milk.

16 Claims, 3 Drawing Sheets

(56) References Cited

U.S. PATENT DOCUMENTS

| | | | |
|---|---|---|---|
| 9,788,686 B2 | 10/2017 | Schlee | |
| 2009/0101021 A1* | 4/2009 | Tonelli | ............... A47J 31/4485 |
| | | | 99/290 |
| 2014/0299001 A1 | 10/2014 | Rimpl | |
| 2015/0150408 A1* | 6/2015 | Schlee | ................. B01F 5/0413 |
| | | | 426/474 |

FOREIGN PATENT DOCUMENTS

| | | | |
|---|---|---|---|
| EP | 0344859 A1 | | 12/1989 |
| EP | 2540200 A1 | | 1/2013 |
| FR | 2638083 A1 | | 4/1990 |
| GB | 450754 | * | 7/1936 |
| GB | 1194747 | * | 6/1970 |
| GB | 1403140 | * | 8/1975 |
| JP | 06189854 | * | 7/1994 |
| JP | 2007130480 A | | 5/2007 |
| JP | 2015119960 A | | 7/2015 |
| WO | 2005/074770 A1 | | 12/2004 |
| WO | WO2005074770 | * | 8/2005 |
| WO | 2013/64232 A1 | | 5/2013 |

OTHER PUBLICATIONS

English Translation for EP2540200 published Jan. 2013.*
English Translation for JP06189854 published Jul. 1994.*
European Search Report dated Aug. 25, 2016 for EP 16 15 6809 (1 page).
Japanese Office Action dated Dec. 20, 2017 for Japanese Patent Application No. 2017-011928.

* cited by examiner

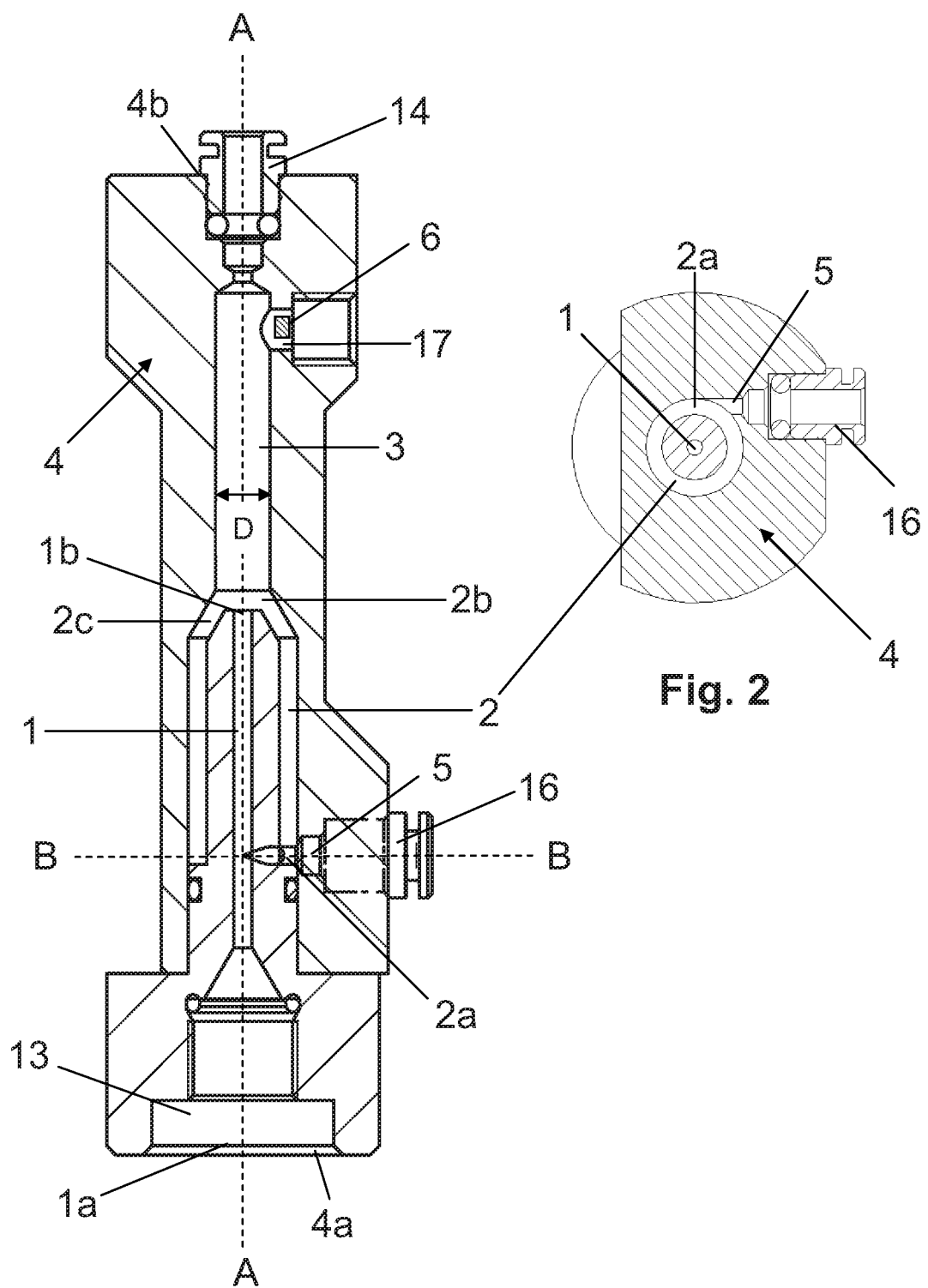

APPLIANCE AND METHOD FOR HEATING AND/OR FROTHING MILK

FIELD OF THE INVENTION

The present invention relates to a heating unit for an appliance for heating and/or frothing milk as well as to an appliance for and a method of heating and/or frothing milk using such a heating unit.

BACKGROUND

Heating units of this type can be used, for example, in beverage making machines, such as fully automatic coffee machines having an appliance for heating and frothing milk, in order to heat and froth milk to prepare coffee, milk beverages and frothed milk beverages. In fully automatic coffee machines, it is possible to prepare, for example, milk beverages or mixed milk beverages, such as cocoa, milk coffee or cappuccino, with the heated and frothed milk.

It is known from the prior art that there are appliances for heating and frothing milk which are equipped with a Venturi system, such as described, for example, in EP 0 234 236 B1 and EP 0 344 859 B1. In these appliances, hot steam is used both as a heating medium and as a propellant for, respectively, heating and propelling the milk. However, the heat output of appliances equipped with a Venturi system is low, and the product properties, such as the temperature of the heated milk or the porosity of the milk foam, can be controlled only to a limited extent.

An improved appliance for heating and/or frothing milk has been disclosed in WO 2013/064232 A1. This appliance comprises a heating unit for heating the milk with steam, with hot steam acting as a heat carrier in the heating unit operating as an injector being injected into the milk. The heating unit comprises an inner flow channel for the hot steam and a flow channel for the milk and/or the milk foam, which latter channel coaxially surrounds the inner flow channel, with the two flow channels being connected to one another by means of a plurality of radial channels that extend at right angles to the direction of flow. This heating unit allows the milk and the hot steam to be supplied separately, which makes it possible to froth the milk to produce a milk foam independently of heating. As a result, the properties and the composition of the milk foam can be controlled independently of the heating process. In addition, heating the milk based on the principle of steam injection also has the advantage that the heating process does not impair the quality of the milk foam since, due to the separately supplied steam, it can be ensured that the temperature of the heated milk is accurately controlled and that the thermal inertia of the preparation system is minimized.

It has been found, however, that in the heating unit disclosed in WO 2013/064232 A1, milk-stone and/or milk incrustations and lime scale can form in the narrow radial channels which connect the inner flow channel for the steam with the outer flow channel for the milk. Such deposits and incrustations in the radial channels can form during or after the heating phase when the milk is heated to high temperatures and cause the radial channels to become narrower, which in turn reduces the heat output and the efficiency of the heating unit. Removing the deposits and incrustations from the radial channels is extremely labor-intensive and time-consuming.

SUMMARY

A heating unit for an appliance for heating and/or frothing milk with improved heat output and is disclosed. A heating unit with reduced maintenance requirement is also disclosed.

Other embodiments are also disclosed.

In the heating unit according to the present invention, hot steam or a mixture of steam and air acting as a heat carrier is injected into the milk in order to heat and/or froth the milk, with the heating unit comprising an inner steam channel and an outer annular channel for the milk, where the latter channel coaxially surrounds the inner channel, and with the hot steam or the mixture of steam and air being introduced at an upstream end of the steam channel and (cold) milk being introduced at an upstream end of the annular channel. According to the present invention, the downstream end of both the steam channel and the annular channel opens out into an outlet channel for discharging the milk that had been heated by the steam or the mixture of steam and air and for discharging the milk foam. Except at the area of their downstream ends, the steam channel and the annular channel for the milk are separated from one another.

As a result, this obviates the need for an arrangement of radial channels which extend at right angles to the direction of flow of the steam channel and the annular channel and which connect the inner steam channel and the annular channel for the milk, which latter channel is coaxially disposed relative to the inner steam channel. Thus, the risk of the formation of milk-stone and/or milk incrustations and lime scale in the narrow radial channels is eliminated.

Preferably, the inner steam channel, the outer annular channel, which coaxially surrounds the inner channel, and the outlet channel are each formed through a reactor block made of a plastic material. Plastic materials to be considered suitable for use in the production of the reactor block are high temperature-resistant thermoplastic polymers, such as polyether ether ketone (PEEK), polysulfone (PSU) or polyetherimide (PEI). The plastic material of the reactor block, which should be temperature-resistant up to approximately 150° C. and of food grade quality or conform to food regulations, should largely avoid heat conduction, which further improves the efficiency of the heating unit.

In the reactor block, the inner steam channel extends in an axial direction, with the upstream end of the steam channel being attachable to a steam line that can be connected to the reactor block, and with the steam or the mixture of steam and air introduced via the steam line flowing in the steam channel vertically against gravity from the bottom to the top toward the downstream end of the steam channel and from there into the outlet channel. Over its entire length (i.e., its extent in the axial direction), the outer annular channel is preferably arranged coaxially around the inner steam channel.

At the downstream end of the inner steam channel, this channel opens out directly into the outlet channel, which is coaxially contiguous with the downstream end of the steam channel, with the diameter of the outlet channel being configured to be larger than the diameter of the steam channel. At the point where the inner steam channel opens out into the coaxially contiguous outlet channel, the downstream end of the outer annular channel for the milk also opens out into the outlet channel. For this purpose, the outer annular channel has a conical section in the area of its downstream end. This conical section of the outer annular channel has an outer diameter which, in the direction of flow, decreases conically from the outer diameter of the outer annular channel to an outer diameter, which conforms to the outer diameter of the outlet channel, into which the downstream end of the conical section of the outer annular channel opens out. Because of this configuration and the fact that the outer annular channel for the milk and the inner steam channel open out into the outlet channel, it is ensured that in the area into which the two channels open out, the hot steam and/or the mixture of steam and air from inner steam channel are/is efficiently and uniformly mixed with the milk from the outer annular channel. Additional and uniform mixing of the steam or the mixture of steam and air with the milk takes place further downstream of the outlet channel. At the downstream end of the outlet channel, this channel is preferably connected to an outlet line for carrying off the heated milk or the frothed milk foam. To this end, a front-end opening with a connecting nozzle for connecting the outlet line is preferably provided on one face of the reactor block.

To feed the hot steam or the mixture of steam and air into the steam channel, an additional front-end opening is provided on the other face of the reactor block, in which opening a connecting nozzle for connecting a steam inlet line is preferably disposed. The steam inlet line is connected to a steam generator which charges the inner steam channel of the heating unit via the steam inlet line with hot steam.

To generate a mixture of steam and air, the steam inlet line is preferably connected to both a steam generator and to a source of compressed gas, thereby making it possible for the steam generator to charge the steam inlet line with steam and for the source of compressed gas to inject a pressurized gas, specifically, compressed air, into the steam inlet channel line. By simultaneously introducing steam and a pressurized gas, specifically, compressed air, the milk can be heated and, at the same time, frothed in the heating unit An especially high flexibility with respect to the properties of the milk foam produced, such as its consistency, creaminess, porosity, foam density and foam stability (drainage), can be achieved if the source of compressed gas generates pressure pulses and periodically injects said pulses into the steam inlet channel line. The parameters of the pressure pulses generated by the source of compressed gas, such as amplitude, pulse duration and pulse repetition rate (pulse frequency), can be expediently changed and adjusted by an operator on the appliance, for example, by means of buttons or dials. By injecting steam and the pressure pulses of compressed gas, a mixture of steam and gas, specifically, a mixture of steam and air, is generated in the steam inlet line and conducted via the steam inlet line into the steam channel of the heating unit and from there into the unit's outlet channel where the mixture of steam and gas is mixed with the milk so as to heat and froth it. The consistency of the milk foam produced in this manner, specifically, the ratio of foam to liquid, as well as other parameters of the foam, such as its creaminess, porosity, foam density and foam stability (drainage), are dependent on the selected parameters of the pressure pulses of the compressed gas and can be influenced by selecting suitable parameters of the pressure pulses. An operator of the appliance can therefore influence the properties of the foam by changing the parameters of the pressure pulses prior to and even during the frothing process. Thus, for example, the pulse repetition rate (pulse frequency) of the pressure pulses that are periodically injected into the steam inlet line can be still changed even during the frothing process. Changing the pulse frequency of the pressure pulses can affect the consistency of the foam produced in the milk.

In this manner, it is possible, for example, to adjust the pulse frequency, infinitely between a minimum value and a maximum value by means of a control dial disposed on the appliance and thereby select the consistency of the milk foam generated within predefined limits between fine and coarse. In this manner, using an appliance with a heating unit according to the present invention, milk foam of any desired consistency can be produced, with the possibility of still being able to adjust the foam consistency (to a certain extent) even during the frothing process.

For the purpose of delivering milk into the heating unit, a radial bore extending at a right or an oblique angle to the longitudinal axis of the annular channel is configured in the reactor block in the area of the upstream end of the outer annular channel. A connecting nozzle for connecting a milk line is disposed in this radial bore. Via this connecting nozzle, one end of the milk line is connected to the radial bore in the reactor block and other end of the milk line opens out into a milk container. The end of the milk line that opens out into the milk container can be configured, for example, in the form of an immersion tube which is immersed in the tank that is filled with milk. To be able to draw the milk from the milk container, a pump is disposed in the milk line. The pump draws the milk from the milk container and delivers the drawn-in milk via the milk line and the radial bore in the reactor block to the outer annular channel so as to supply it with milk.

An especially efficient way of introducing the milk to the outer annular channel can be ensured by making the radial bore open out tangentially into the annular channel. This makes it possible to prevent turbulence while the milk is flowing into the outer annular channel.

BRIEF DESCRIPTION OF THE DRAWINGS

These and additional advantages and features of the present invention follow from the embodiment example described in greater detail below with reference to the appended drawings. The drawings show:

FIG. 1: A longitudinal section through a heating unit according to the present invention;

FIG. 2: A cross section through the heating unit of FIG. 1 along the plane B-B;

DETAILED DESCRIPTION

Figure 3:
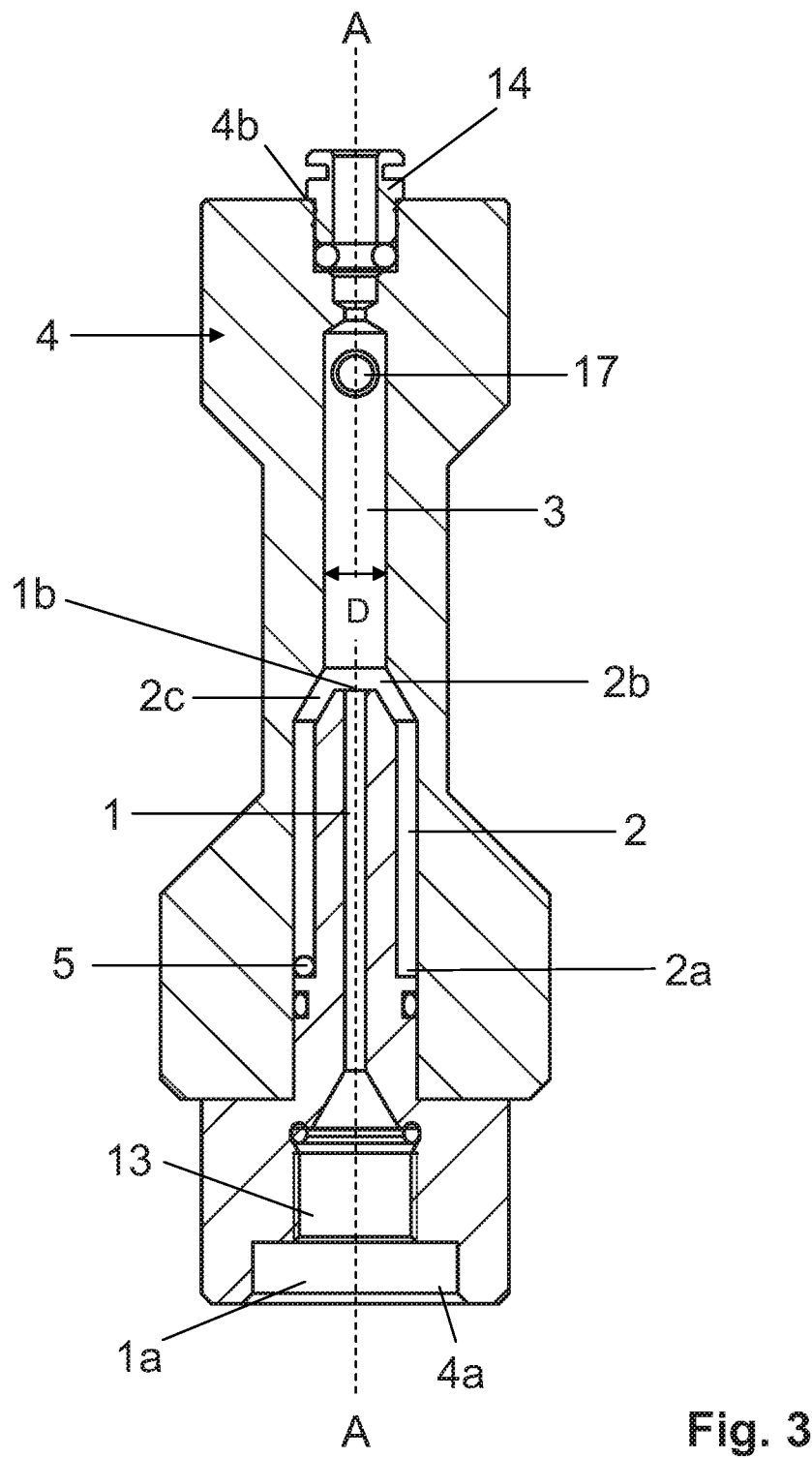
FIG. 3: A longitudinal section through the heating unit of FIG. 1 along the plane A-A.

The heating unit according to the present invention shown in FIGS. 1-3 comprises a reactor block 4 made of a plastic material, specifically, PEEK, PSU or PEI, which essentially has the form of a cylinder with a longitudinal center axis A. An inner steam channel 1, an outer annular channel 2, which coaxially surrounds the inner steam channel 1, and an outlet channel 3, which is coaxially disposed relative to the steam channel 1, are formed through the reactor block 4. The steam channel 1 has an upstream end 1a, which is formed by a front-end opening 4a in the reactor block 4. In addition, the inner steam channel 1 has a downstream end 1b, which opens out into the outlet channel 3, which in the downstream direction is coaxially contiguous with the steam channel 1. The outlet channel 3 ends in a front-end opening 4b in the reactor block 4. The diameter of the outlet channel 3 is larger than the diameter of the steam channel 1, for example, twice as large. Over its entire length (i.e., its extent in the axial direction), the outer annular channel 2 is arranged coaxially to the inner steam channel, as indicated in FIGS. 1 and 3, with the inner steam channel 1 in the illustrated embodiment example being slightly longer than the annular channel 2 coaxially surrounding the inner steam channel. However, it is also possible to configure the inner steam channel 1 and the annular channel 2 to have the same length A connecting nozzle 13 is disposed in the steam channel 1 in the area of the upstream end 1a. Via this connecting nozzle 13, the inner steam channel 1 can be connected to a steam inlet channel line, which is not shown in FIGS. 1-3, by means of which hot steam or a mixture of steam and air can be introduced. At the downstream end of the outlet channel 3, an additional connecting nozzle 14 is provided so as to be able to connect an outlet line 15.

The outer annular channel 2 which coaxially surrounds the inner steam channel 1 also has an upstream end 2a and a downstream end 2b. At the upstream end 2a of the outer annular channel 2, this channel is connected to a radial bore 5 in the reactor block 4 (as shown in FIG. 2). As FIG. 2 indicates, the radial bore 5 at the upstream end 2a of the outer annular channel tangentially opens out into the annular channel 2. An additional connecting nozzle 16 is disposed in the radial bore 5. Via this connecting nozzle 16, the radial bore 5 can be connected to a milk line (not shown in FIGS. 1-3). Via this milk line, (cold) milk can be introduced into the radial bore 5 and from there into the outer annular channel 2.

As FIGS. 1 and 3 show, in the area of its downstream end 2b, the outer annular channel 2 comprises a conical section 2c. In this conical section 2c, the outer diameter of the annular channel 2 decreases in a conical or tapered form, with the channel diameter remaining the same, to the diameter D of the outlet channel 3. The [sic; At the] downstream end 2b of the outer annular channel 2, at which the conical section 2c has an outer diameter that conforms to the diameter D of the outlet channel 3, the annular channel 2 opens out into the outlet channel 3. In the area in which both the inner steam channel 1 and the outer annular channel 2 open out into the outlet channel 3, the steam or the mixture of steam and air supplied by the steam channel 1 is mixed with the milk supplied by the outer annular channel 2. In the course of mixing the hot steam or the mixture of steam and air with the milk, the milk is heated and, if the mixture of steam and air is used, frothed to produce a milk foam.

To measure the temperature of the heated or frothed milk, a temperature sensor 6 is preferably provided in the downstream area of the outlet channel 3. The temperature sensor 6 is disposed in a radial bore 17 which opens out into the outlet channel 3.

Figure 4:
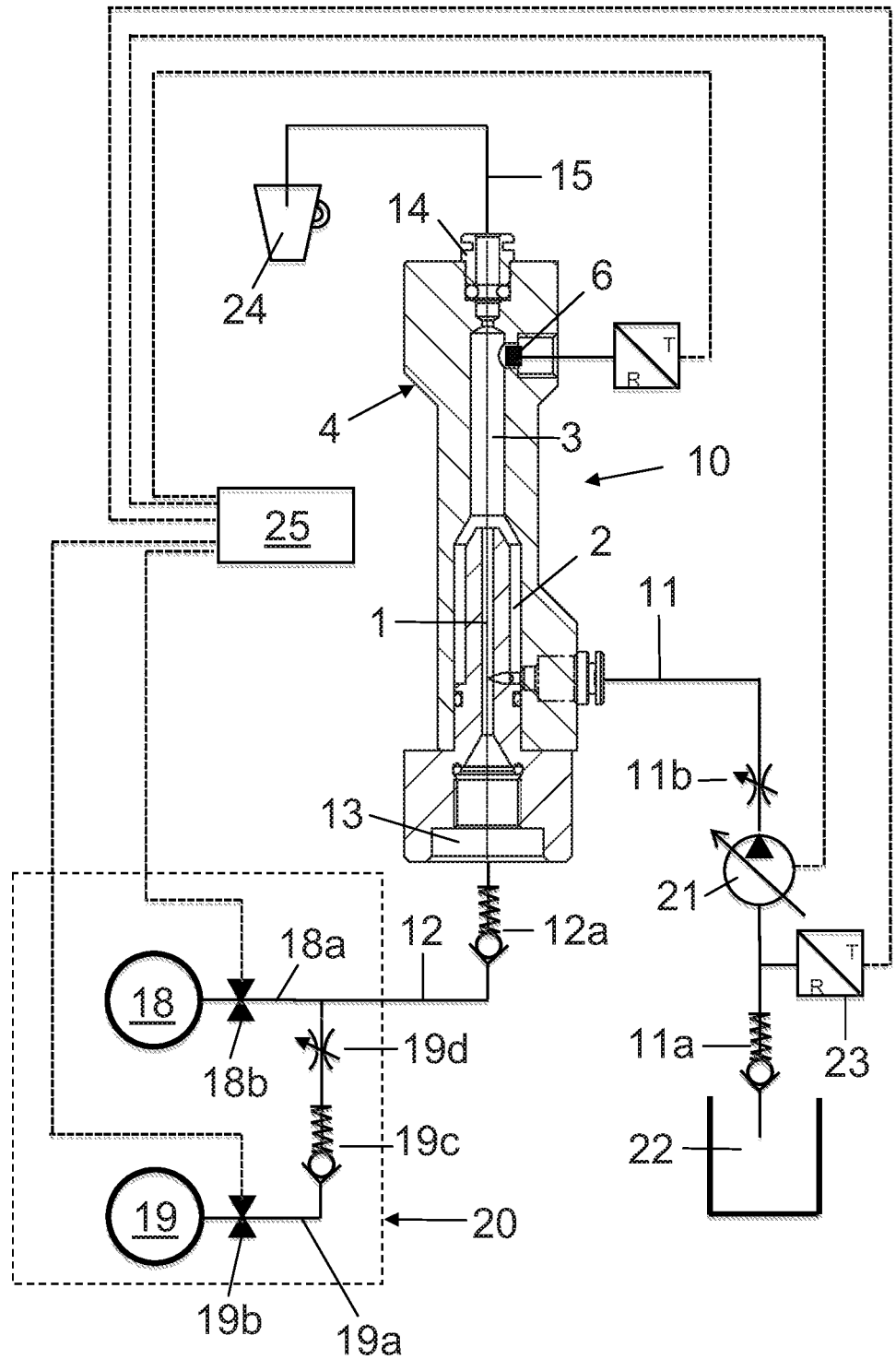
FIG. 4: A diagrammatic representation of an appliance for heating and/or frothing milk using a heating unit according to the present invention.

FIG. 4 shows a diagrammatic representation of an appliance for heating and frothing milk using a heating unit 10 according to the present invention. In this diagram, the upstream end 1a of the steam channel 1 is connected with a steam inlet line 12. The steam inlet line 12, in which a check valve 12a is disposed, connects the heating unit 10 to a device 20 for generating a mixture of steam and air. The device 20 for generating a mixture of steam and air comprises a steam generator 18 and a compressed gas source 19. The steam generator 18 is connected to the steam inlet line 12 via a steam line 18a, and the compressed gas source 19 is connected to the steam inlet line 12 via a compressed gas line 19a. In the compressed gas line 19a, an electrically controlled switching valve (for example, a solenoid valve) 19b, a check valve 19c and a controllable throttle valve 19d are disposed. In the steam line 18a, an electrically controlled switching valve (for example, a solenoid valve) 18b is disposed as well.

In the appliance shown in FIG. 4, the upstream end 2a of the annular channel 2 of the heating unit 10 according to the present invention is connected to a milk line 11. One free end of the milk line 11 is configured in the form of an immersion tube and is immersed in a tank 22 containing cold milk. In the milk line 11, a check valve 11a, a pump 21 and a controllable throttle valve 11b are disposed. By means of the pump 21, cold milk can be drawn via an immersion tube from the tank 22 into the milk line 11 and from there can be delivered into the annular channel 2 of the heating unit 10. To measure the temperature of the drawn-in milk, a temperature sensor 23 is preferably disposed in the milk line 11.

An outlet line 15 is connected to the downstream end of the outlet channel 3 of the heating unit 10. One free end of the outlet line 15 opens out into a cup 24. The product produced in the heating unit 10, which in the embodiment example illustrated in FIG. 4 is milk foam, is delivered into the cup 24 via the outlet line 15.

A control unit 25 is provided for the purpose of controlling the appliance. The control unit 25 is linked with the temperature sensors 6 and 23 which measure the temperature of the cold milk and the product produced (heated milk and milk foam, respectively). In addition, the control unit 25 is arranged to control the opening and closing of the valves 18b and 19b respectively located in the steam line 18a and the compressed gas line 19a. The control unit 25 also serves to control the pump 21 in the milk line 11.

According to a preferred embodiment example of the appliance shown in FIG. 4, the compressed gas source 19 generates pressure pulses of compressed gas. For this purpose, the compressed gas source 19 comprises a compressor which compresses a gas, specifically, air, to produce a compressed gas (compressed air). The compressed gas source 19 is preferably configured in such a manner that it is able to inject, at a predefinable frequency, periodic pressure pulses of the compressed gas via the compressed gas line 19a into the steam inlet line 12. The compressed gas source 19 can preferably be actuated by pulse width modulation. The actuation is performed by the control unit 25.

The pressure pulses of the compressed gas source 19 are preferably periodically injected at an adjustable frequency via the compressed gas line 19a through the controllable throttle valve 19d into the steam inlet line 12. In the steam inlet line 12, the pulses of the compressed gas (specifically, compressed air) are mixed with the hot steam delivered by the steam source 19 [sic] via the steam line 18a into the steam inlet line 12 and generate a pulsed mixture of steam and air in the steam inlet line 12. The pulsed mixture of steam and air is introduced via the steam inlet line 12 into the inner steam channel 1 of the heating unit 10 and from there flows into outlet channel 3. In the outlet channel 3, the pulses of the mixture of steam and air are mixed with the cold milk, which was introduced via the outer annular channel 2 into the heating unit 10, which causes the milk to be heated and frothed to produce a milk foam. The product produced in this manner (milk foam) is delivered via the outlet channel 3 into outlet line 15 and from there into cup 24.

By adjusting the parameters of the pressure pulses generated by the compressed gas source 19, for example, their frequency and amplitude, it is possible to influence and adjust the composition of the milk foam produced in the heating unit 10. To be able to adjust the frequency and amplitude of the pressure pulses to the desired values, the control unit 25 comprises adjustment means, for example, a control dial or buttons, by means of which the frequency and/or the amplitude of the pressure pulses can preferably be infinitely adjusted between a minimum value and a maximum value. The amplitude of the pressure pulses can be controlled, for example, by adjusting the output of the compressor of the compressed gas source 19 or the position of the controllable throttle valve 19*d*.

Thus, the consistency of the milk foam produced, specifically, the ratio of foam to liquid, as well as other parameters of the foam, for example, its creaminess, porosity, foam density and the foam stability (drainage), can be influenced by selecting suitable parameters of the pressure pulses. An operator of the appliance can thereby influence the properties of the foam by changing the parameters of the pressure pulses prior to and even during the frothing process. Thus, for example, the pulse repetition rate (pulse frequency) of the pressure pulses periodically injected into the steam inlet line 12 can still be changed even during the frothing process. In this manner, it is, for example, possible by means of a control dial disposed on the appliance to adjust the pulse frequency infinitely between a minimum value and a maximum value and thereby select the consistency of the foam produced within predefined limits between fine and coarse.

What is claimed is:

1. An appliance for heating and/or frothing milk, the appliance comprising:
    a heating unit;
    a steam generator for feeding steam into the heating unit; and
    a milk pump for feeding milk into the heating unit,
    wherein the steam or a mixture of steam and air acting as a heat carrier is injected into the milk, the heating unit comprising a reactor block that includes a steam channel extending in an axial direction in the reactor block, an annular channel for the milk, and an outlet channel for discharging the heated and/or frothed milk,
    wherein the steam channel has an upstream end and a downstream end, the annular channel has an upstream end and a downstream end, and the annular channel coaxially surrounds the steam channel,
    wherein the downstream ends of both the steam channel and the annular channel open out into the outlet channel,
    wherein hot steam or a mixture of steam and air is introduced by the steam generator at the upstream end of the steam channel, and milk is introduced by the milk pump at the upstream end of the annular channel,
    wherein the upstream end of the steam channel is connected to a steam inlet line, the steam or the mixture of steam and air being introduced into the steam channel by the steam generator via the steam inlet line and flowing in the steam channel vertically against gravity from the upstream end towards the downstream end of the steam channel,
    wherein the upstream end of the annular channel is connected to a milk line, the milk being introduced into the annular channel by the milk pump via the milk line and flowing in the annular channel vertically against gravity from the upstream end towards the downstream end of the annular channel, and
    wherein the milk and the steam or the mixture of steam and air mix in the outlet channel so as to cause the milk to be heated and/or frothed, the heated and/or frothed milk flowing in the outlet channel vertically against gravity.
2. The appliance of claim 1, wherein the reactor block is made of a plastic material.
3. The appliance of claim 1, wherein the reactor block is at least for the most part configured in the form of a cylinder having a longitudinal center axis, the steam channel and the outlet channel extending over the longitudinal center axis of the reactor block, the annular channel being disposed coaxially relative to the longitudinal center axis of the reactor block, and the upstream end of the steam channel being formed by a front-end opening in the reactor block.
4. The appliance of claim 1, wherein at the upstream end, the annular channel is connected to a radial bore extending at a right angle or an oblique angle to the annular channel in the reactor block, the milk line being connected to the upstream end of the annular channel via the radial bore.
5. The appliance of claim 4, wherein the radial bore opens out tangentially into the annular channel.
6. The appliance of claim 1, further comprising a front-end opening at the upper end of the reactor block, the front-end opening forming an outlet for discharging the heated and/or frothed milk from the outlet channel.
7. The appliance of claim 1, wherein a temperature sensor for measuring the temperature of the heated and/or frothed milk is disposed in the outlet channel.
8. The appliance of claim 1, further comprising:
    a device for generating a mixture of steam and air,
    wherein the device comprises the steam generator and a compressed air source, and
    wherein the steam generator and the compressed air source are both connected to the steam inlet line, the steam generator charging the steam inlet line with steam and the compressed air source generating pressure pulses of compressed air and injecting the pressure pulses of compressed air into the steam inlet line.
9. The appliance of claim 8, wherein the compressed air source is activated by pulse width modulation and/or emits the pressure pulses of compressed air at an adjustable pulse frequency.
10. A method of heating and/or frothing milk, the method comprising:
    providing a heating unit comprising a reactor block that includes a steam channel extending in an axial direction in the reactor block, an annular channel for the milk, and an outlet channel for discharging the heated and/or frothed milk, the steam channel having an upstream end and a downstream end, the annular channel having an upstream end and a downstream end, the annular channel coaxially surrounding the steam channel, the downstream ends of both the steam channel and the annular channel opening out into the outlet channel, the upstream end of the steam channel being connected to a steam inlet line, and the upstream end of the annular channel being connected to a milk line;
    supplying, by a steam generator via the steam inlet line, hot steam or a mixture of steam and air to the upstream end of the steam channel;
    supplying, by a milk pump via the milk line, the milk to the upstream end of the annular channel;
    flowing the steam or the mixture of steam and air through the steam channel against gravity from the upstream end to the downstream end of the steam channel and from there into the outlet channel;
    flowing the milk through the annular channel against gravity from the upstream end to the downstream end of the annular channel and from there into the outlet channel; and
    mixing the steam or the mixture of steam and air with the milk in the outlet channel so as to cause heating and/or frothing of the milk, and flowing the heated and/or frothed milk in the outlet channel vertically against gravity.

11. The appliance of claim 1, wherein at the downstream end of the annular channel, the annular channel comprises a conical section that merges into the outlet channel.

12. The appliance of claim 11,
wherein, except in the area of their downstream ends, the steam channel and the annular channel are separated from one another, and
wherein the annular channel coaxially surrounds the steam channel over the entire length of the annular channel.

13. The appliance of claim 11, wherein the outlet channel is configured tubularly.

14. The appliance of claim 1, wherein, except in the area of their downstream ends, the steam channel and the annular channel are separated from one another.

15. The appliance of claim 14, wherein the annular channel coaxially surrounds the steam channel over the entire length of the annular channel.

16. The method of claim 10, further comprising:
using the steam generator to charge the steam inlet line with steam; and
using a compressed air source to generate pressure pulses of compressed air that are injected into the steam inlet line.

* * * * *